United States Patent [19]

Paquette

[11] 4,314,825

[45] Feb. 9, 1982

[54] PROCESS OF PREPARING COMBUSTIBLE SOLID FUEL

[76] Inventor: Gerald J. Paquette, 2716 - 29th Ave. Northeast, Minneapolis, Minn. 55418

[21] Appl. No.: 181,487

[22] Filed: Aug. 26, 1980

[51] Int. Cl.$^3$ ............................................. C10L 5/44
[52] U.S. Cl. .................................... 44/10 A; 44/1 D; 44/10 H
[58] Field of Search ................... 44/10 A, 15 C, 15 D, 44/1 D, 10 H

[56] References Cited

U.S. PATENT DOCUMENTS

| | | | |
|---|---|---|---|
| 128,478 | 7/1872 | Fleischmann | 44/10 A |
| 233,868 | 11/1880 | Smith | 44/10 A |
| 739,936 | 9/1903 | Smith | 44/10 A |
| 2,668,099 | 2/1954 | Cederquist | 44/33 |
| 3,227,530 | 1/1966 | Levelton | 44/1 |
| 3,436,312 | 4/1969 | Leonor | 44/1 R |
| 3,635,684 | 1/1972 | Seymour | 44/10 R |
| 3,689,234 | 9/1972 | Onozawa | 44/17 |
| 3,910,775 | 10/1975 | Jackman | 44/13 |
| 3,946,660 | 3/1976 | Kuhtreiber | 100/39 |

FOREIGN PATENT DOCUMENTS

| | | | |
|---|---|---|---|
| 8304 | of 1896 | United Kingdom | 44/15 C |
| 7884 | of 1902 | United Kingdom | 44/15 C |
| 21755 | of 1905 | United Kingdom | 44/15 C |
| 12154 | of 1912 | United Kingdom | 44/15 C |
| 105340 | 4/1917 | United Kingdom | 44/10 A |
| 398007 | 9/1933 | United Kingdom | 44/15 C |

*Primary Examiner*—Carl F. Dees
*Attorney, Agent, or Firm*—Orrin M. Haugen; Thomas J. Nikolai

[57] ABSTRACT

A process for preparing combustible solid fuel from grain residue which includes the steps of passing the grain residue through a pelletizing zone wherein the residue is subjected to compaction pressure of greater than about 100 psi while passing live steam therethrough for a period sufficient to cause the in-situ cellulose to form a cohesive pelletized mass. The pellets are thereafter permitted to cool and dry and are then ready for use as solid fuel.

4 Claims, 1 Drawing Figure

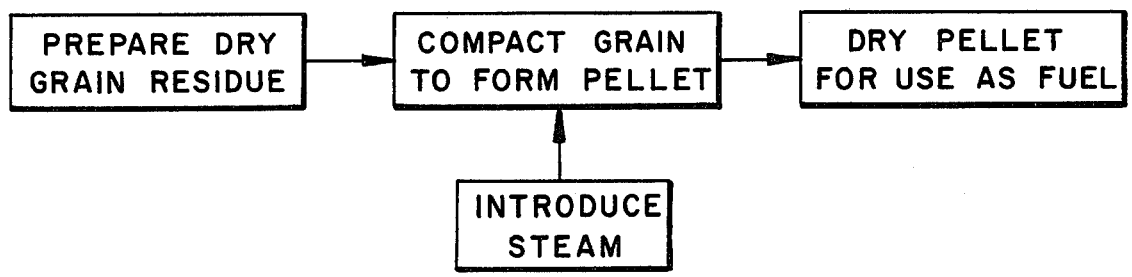

4,314,825

PROCESS OF PREPARING COMBUSTIBLE SOLID FUEL

BACKGROUND OF THE INVENTION

The present invention relates generally to an improved process for preparing combustible solid fuels, and more particularly to such a process for preparing a combustible solid fuel from grain residue which utilizes the in-situ cellulose to form a cohesive solid pellet. Live steam is utilized to cause the cellulose to form a binder material, with the pelletized product thereafter being useful as a fuel without increasing the ash or solid residue.

Fuel costs, and the cost of producing energy have increased substantially in the recent past. Alternate fuel sources are, of course, desirable, and particularly when an alternate fuel source is available from a recurring yearly source of supply. The cost of the product is relatively low, and it may be burned efficiently with the production of only modest or low amounts of solid residue.

Specifically, the process of the present invention provides an alternate source of combustible solid fuels, and utilizes grain residue which is normally discarded as a waste product. The grain residue is treated so as to form a pellet which is cohesive in form, and which may be burned either directly, or in combination with other solid or liquid fuels such as, for example, coal.

Grain residue is a waste product generated in the conversion of grain to edible products. The residue is produced in substantial quantities in mills, elevators, as well as in the agricultural fields. The process of the present invention utilizes these waste products to form a combustible solid fuel which is capable of being transported with modest protection from the elements, thereby retaining its useful form.

The benefits of utilization of grain residue as a fuel include the relatively low cost of the material, and particularly the low unit costs of BTU's. The grain residue is an item which is in recurring supply, with each annual crop providing a substantial quantity of this material. Since the material is capable of compaction and formation of pellets, the costs of storage are reduced, as are, of course, the costs of maintaining any inventory of this material. The material has a relatively high heat content, with the BTU's per pound being greater than that of either lignite coal or wood, while being less than that of anthracite coal or the like. The material burns with an extremely low sulfur content and produces very little solid waste in the form of ash. Another ultimate benefit of the use of this material is the preservation of irreplaceable natural resources.

SUMMARY OF THE INVENTION

Briefly, in accordance with the present invention, dry grain residue in the form of bran from wheat, or other residues from durum wheat, barley, oats, rye, soybeans, corn, flaxseed, sunflower seeds, sorghum, millet, or other materials are selected and dried. The residue is in the form of grain dust, chaff, straw, screenings, and any grain which fails to meet standard grading requirements, with such grains normally being identified as "not standard grain". This material is then passed through a compaction zone wherein the grain is compacted under unit pressures in excess of about 500 psi, with live steam being introduced to activate the in-situ cellulose content of the material. The grain residue material is retained in the compaction zone for a period sufficient to cause the in-situ cellulose to become cohesive, thereby forming a finished pelletized product. For most purposes, and for the preparation of pellets having a highly cohesive structure, pellets are preferably cylindrical with an outer diameter of between about one-quarter to one inch, and with any convenient axial length, such as from about one-quarter inch to 2 inches. Such pellets are readily handled, and the size is such that production can be obtained without significant or unusual problems. The pellets treated in accordance with the procedure outlined with have a density of about 0.85, with lighter unit pressures providing a pellet with a lower density. Lower densities are generally not as desirable inasmuch as the storage requirements are greater, and the cohesive nature of the product is not as good as that having a density of about 0.85.

Therefore, it is a primary object of the present invention to provide an improved process for the preparation of a combustible solid fuel from grain residues, wherein the grain residue is compacted and formed into pellets under the influence of high pressure and live steam, with the steam providing the energy necessary to cause the in-situ cellulose to form a cohesive mass.

It is a further object of the present invention to provide an improved process for the preparation of a combustible solid fuel from grain residues, which includes the formation of pellets of the residue material by the mechanism of compaction under pressure while subjecting the mass to live steam to cause the in-situ cellulose to form a cohesive binder for the pelletized material.

Other and further objects of the present invention will become apparent to those skilled in the art upon a study of the following specification, appended claims, and accompanying drawing.

BRIEF DESCRIPTION OF THE DRAWING

The drawing is a schematic flow diagram illustrating the steps undertaken in the preparation of combustible solid fuels from grain residues.

DESCRIPTION OF THE PREFERRED EMBODIMENT

In accordance with the preferred modification of the present invention, and with particular attention being directed to the FIGURE of the drawing, a dry grain residue is initially dried and prepared for the compaction operation. Specifically, the grain residue includes such residues as are obtained in the milling process of wheat, durum wheat, barley, oats, rye, soybeans, corn, flaxseed, sunflower seeds, sorghums, mixed grain or the like. This residue is in the form of grain dust, chaff, straw, screenings, and may in certain instances, include such materials as not standard grain. The residues are then passed through a pelletizing mill, with a mill having a power capability of 100 hp to about 200 hp being found highly desirable. A single speed commercial pellet mill of the commercially available types are, of course, adaptable for use in connection with the present invention. Either round or square pellets may be formed, with the ultimate configuration not being highly critical to the overall process. Ordinarily, the configuration is based upon the cross-sectional dimension, which is preferably in the area of from one-quarter inch to one inch, with this dimension providing a desirable size for through-treatment with the steam used in the binding process. The ultimate user may have a selection as to round configurations or square configurations, depending upon the requirements of a conveyor mechanism, if utilized.

In the compaction zone, unit pressures are raised to approximately 500 psi or greater in order to provide the force necessary to compact the residue into pellet form. Live steam is introduced into the compaction chamber, with steam at approximately 100 psi having been found to be desirable. This steam has sufficient energy to cause the in-situ cellulose present in the residue to form a cohesive mass for the entire material. Colloidal clay has been useful in the formation of a binder material as well.

The time of exposure to the steam under pressure is preferably in the area of approximately one second or more, with this period of time being sufficient to cause the in-situ cellulose to become cohesive for the finished pellet material. Longer periods of time may, of course, be utilized, however extended periods of time may be counter productive in that the cellulose material may be destroyed to the extent that it would not form the cohesive mass.

Pelletized oat screenings have been prepared in accordance with the above description, with the results of testing being as follows:

| Pelletized Oat Screenings | |
|---|---|
| Moisture | 5.57% |
| Ash | 5.14% |
| Sulfur | 0.08% |
| BTU/pound | 7700 |
| BTU/pound (dry basis) | 8154 |

It can be seen that the costs per million BTU's is relatively low, and this form of energy is obtained with an annually recurring supply. The utilization of this material as a fuel also assists in reduction of the solid wastes deposited in areas adjacent industrialized areas such as adjacent grain mills, elevators, and the like. The ash content of the pelletized oat screenings is sufficiently low so as to not impose a significant burden upon the solid waste disposal. The sulfur content is also exceptionally low, thereby providing a fuel which is non-polluting to the environment when properly burned.

While the above example has been given with respect to pelletized oat screenings, similar results are obtained from the other pelletized residues mentioned.

I claim:

1. The process of preparing a combustible solid fuel from grain residue which comprises the steps of:
    (a) passing grain residue through a pelletizing zone wherein the said residue is subjected to a compaction pressure of greater than about 500 psi with said compaction pressure being maintained while passing live steam therethrough, with these conditions being maintained for a period of time sufficient to cause the insitu cellulose to become cohesive.

2. The process as defined in claim 1 being particularly characterized in that said grain residue is subjected to said compaction pressure and live steam simultaneously for a period of about one second.

3. The process as defined in claim 1 being particularly characterized in that the pelletizing zone has a cross-sectional dimension less than about one inch.

4. The process as defined in claim 1 being particularly characterized in that the compaction pressure is selected to form a solid pellet having a density greater than about 0.85.

* * * * *